(12) United States Patent
Sargent et al.

(10) Patent No.: US 7,763,300 B2
(45) Date of Patent: *Jul. 27, 2010

(54) METHOD OF MAKING FLAVORED COFFEE COMPOSITIONS

(75) Inventors: Jeffrey Alan Sargent, West Chester, OH (US); Douglas Craig Hardesty, Amelia, OH (US)

(73) Assignee: The Folgers Coffee Company, Cincinnati, OH (US)

( * ) Notice: Subject to any disclaimer, the term of this patent is extended or adjusted under 35 U.S.C. 154(b) by 1029 days.

This patent is subject to a terminal disclaimer.

(21) Appl. No.: 10/889,668

(22) Filed: Jul. 13, 2004

(65) Prior Publication Data

US 2004/0265449 A1     Dec. 30, 2004

Related U.S. Application Data

(62) Division of application No. 10/156,282, filed on May 28, 2002, now Pat. No. 6,841,185.

(60) Provisional application No. 60/344,931, filed on Oct. 19, 2001.

(51) Int. Cl.
A23F 5/00 (2006.01)

(52) U.S. Cl. .................. 426/594; 426/650; 426/443; 426/471

(58) Field of Classification Search ............. 426/594, 426/650, 443, 471
See application file for complete search history.

(56) References Cited

U.S. PATENT DOCUMENTS

| | | | |
|---|---|---|---|
| 2,469,553 A | 5/1949 | Hall | |
| 2,750,998 A | 6/1956 | Moore | |
| 2,771,343 A | 11/1956 | Arnold et al. | |
| 3,310,612 A | 3/1967 | Somerville, Jr. | |
| 3,373,041 A | 3/1968 | Bloom et al. | |
| 3,436,227 A | 4/1969 | Bergeron et al. | |
| 3,493,388 A | 2/1970 | Hair et al. | |
| 3,615,667 A | 10/1971 | Joffe | |
| 3,615,669 A | 10/1971 | Hair et al. | |
| 3,620,756 A | 11/1971 | Strobel et al. | |
| 3,625,703 A * | 12/1971 | Ericson | 426/595 |
| 3,652,293 A | 3/1972 | Lombana et al. | |
| 3,660,106 A | 5/1972 | McSwiggin et al. | |
| 3,742,100 A | 6/1973 | Boyum et al. | |
| 3,753,726 A | 8/1973 | Clinton et al. | |
| 3,964,175 A | 6/1976 | Sivetz | |
| 4,110,485 A | 8/1978 | Grubbs et al. | |
| 4,267,200 A | 5/1981 | Klien et al. | |
| 4,283,432 A | 8/1981 | Mitchell et al. | |
| 4,331,696 A | 5/1982 | Bruce, III | |
| 4,338,346 A | 7/1982 | Brand | |
| 4,399,163 A | 8/1983 | Brennan et al. | |
| 4,411,925 A | 10/1983 | Brennan et al. | |
| 4,423,029 A | 12/1983 | Rizzi | |
| 4,438,147 A | 3/1984 | Hedrick, Jr. | |
| 4,528,200 A | 7/1985 | Coleman | |
| 4,626,435 A | 12/1986 | Zimmerman | |
| 4,637,935 A | 1/1987 | Kirkpatrick et al. | |
| 5,160,757 A | 11/1992 | Kirkpatrick et al. | |
| 5,384,143 A | 1/1995 | Koyama et al. | |
| 5,433,962 A * | 7/1995 | Stipp | 426/96 |
| 5,462,759 A | 10/1995 | Westerbeek et al. | |

(Continued)

FOREIGN PATENT DOCUMENTS

CA     2105037     3/1994

(Continued)

OTHER PUBLICATIONS

XP-002214771—Carboxylic Acids—Coffee: vol. 1—Chemistry, pp. 271-281, date not provided.

(Continued)

*Primary Examiner*—Anthony Weier
(74) *Attorney, Agent, or Firm*—Calfee, Halter & Griswold LLP

(57) ABSTRACT

The present invention relates to non-segregating, non-agglomerated flavored coffee compositions. In particular, the present invention relates to novel flavored coffee compositions that minimize or inhibit the segregation and separation of constituent components, and the corresponding processes for making such compositions. The flavored coffee compositions herein are characterized as having a roast and ground, an instant coffee component, or mixtures thereof. The roast and ground coffee component will have a moisture level in the range of from about 1% to about 15%, a particle density in the range of from about 0.1 g/cc to about 0.45 g/cc, and a mean particle size distribution in the range of from about 400 microns to about 1300 microns. The instant coffee components used herein will have a particle density in the range of from about 0.1 g/cc to about 0.8 g/cc, a mean particle size distribution in the range of from about 250 microns to about 2360 microns, and a moisture level in the range of from about 1% to about 4.5%. The flavored coffee composition further includes a flavoring component with a moisture level in the range of from about 1% to about 7%, a particle density in the range of from about 0.1 g/cc to about 0.8 g/cc, and a mean particle size distribution in the range of from about 5 microns to about 150 microns. The ratio of coffee component particle size to flavor component particle size is in the range of from about 100:1 to about 5:1.

1 Claim, No Drawings

U.S. PATENT DOCUMENTS

| | | | |
|---|---|---|---|
| 5,635,238 | A | 6/1997 | Trinh et al. |
| 5,993,877 | A | 11/1999 | Ohtake |
| 6,004,593 | A | 12/1999 | Soughan |
| 6,207,206 | B1 | 3/2001 | Mickowski et al. |
| 6,290,997 | B1* | 9/2001 | Villagran et al. ............. 426/72 |
| 6,299,925 | B1 | 10/2001 | Xiong et al. |
| 6,841,185 | B2* | 1/2005 | Sargent et al. ............. 426/594 |
| 2003/0039731 | A1* | 2/2003 | Dalton et al. ............. 426/433 |
| 2003/0077372 | A1 | 4/2003 | Sargent et al. |
| 2003/0180431 | A1 | 9/2003 | Young |

FOREIGN PATENT DOCUMENTS

| | | | |
|---|---|---|---|
| CA | 2166863 | | 1/1995 |
| CA | 2279287 | | 8/1998 |
| DE | 37 10 768 | A1 | 10/1988 |
| DE | 44 11 204 | A1 | 10/1995 |
| DE | 195 40 014 | A1 | 4/1997 |
| DE | 19540014 | * | 4/1997 |
| EP | 0 168 112 | | 1/1986 |
| EP | 0 560 609 | A1 | 9/1993 |
| EP | 674839 | | 3/1995 |
| EP | 0 861 596 | A1 | 9/1998 |
| GB | 1361387 | | 7/1974 |
| JP | 62044137 | | 2/1987 |
| JP | 08173043 | | 7/1996 |
| WO | 99/39587 | | 8/1999 |
| WO | WO 01/00039 | * | 1/2001 |
| WO | WO 01/00039 | A1 | 1/2001 |
| WO | 03/032743 | | 4/2003 |

OTHER PUBLICATIONS

XP-002227483—Flavouring Dried Coffee Extracts, Abtract Only date not provided.

Hunter, R.S.—"Photoelectric Color Difference Meter"—Journal of the Optical Society of America, vol. 48, No. 12, (Dec. 1958), pp. 985-995.

Coffee Processing Technology, vol. II, Avi Publishing Co., (1963), pp. 127-131 and 137-140.

Pintaufo, N.D.—Coffee Solubilization Commercial Processes and Techniques, Noyes Data Corporation, "Agglomeration Techniques" (1975), pp. 177-209.

Sivetz, M., et al.—"Coffee Roasting"—Coffee Technology, Avi Publishing Co. (1979), pp. 226-246.

Sivetz, M., et al.—"Spray Drying. I. Equipment", Chapter 11, Coffee Processing Technology, vol. 1, Avi Publishing Co. (1963), pp. 382-513.

Roberts, A.G., et al.—"The Large Scale Application of Prilling"—The Chemical Engineer, No. 304, (Dec. 1975), pp. 748-750.

Harper, W.J.—Kirk-Othmer Encyclopedia of Chemical Technology, Willey Interscience, $3^{rd}$ Ed., vol. 22, (1978), Section Entitled: "Synthetic and Imitation Dairy Products", pp. 465-498.

Morrison & Boyd—Organic Chemistry $3^{rd}$ Ed., pp. 3-4, date not provided.

Fayed & Otten—Handbook of Powder Science & Technology, $2^{nd}$ Ed., International Thomson Publishing (1997), pp. 446-453.

Workman, J.J., et al.—"Review of Chemometrics Applied to Spectroscopy: 1985-95, Part 1"—Applied Spectroscopy Reviews, vol. 31 (1&2), (1996), pp. 73-124.

International Search Report from PCT/US02/33376 dated Feb. 27, 2003.

Office action from U.S. Appl No. 10/156,282 dated Mar. 23, 2004.

Response to Restriction from U.S. Appl. No. 10/156,282 dated Apr. 23, 2004.

Notice of Allowance from U.S. Appl. No. 10/156,282 dated Jul. 2, 2004.

Supplemental Notice of Allowability from U.S. Appl. No. 10/156,282 dated Sep. 14, 2004.

Office action from Japanese Application No. 2003-535557 dated Jul. 22, 2008.

Communication from EP Serial No. 02776236.8 dated Feb. 8, 2006.

Response to Communication from EP Serial No. 02776236.8 dated Aug. 3, 2006.

Communication from EP Serial No. 02776236.8 dated Oct. 12, 2006.

Response to Communication from EP Serial No. 02776236.8 dated Apr. 19, 2007.

Communication from EP Serial No. 02776236.8 dated Sep. 27, 2007.

Response to EP Communication from Serial No. 02776236.8 dated Jan. 15, 2008.

Office Action dated Jan. 22, 2009, for related Canadian Patent Application No. 2,459,663.

Communication from European Application No. 0277623638 dated Aug. 3, 2006.

Office action from Japanese Application No. 2003-53557 dated Jul. 22, 2008.

* cited by examiner

METHOD OF MAKING FLAVORED COFFEE COMPOSITIONS

CROSS REFERENCE TO RELATED APPLICATION

The present is a Divisional Application of U.S. application Ser. No. 10/156,282, filed May 28, 2002, now U.S. Pat. No. 6,841,185, which claims the benefit of priority to U.S. Provisional Application Ser. No. 60/344,931, filed Oct. 19, 2001, both of which are herein incorporated by reference.

FIELD OF THE INVENTION

The present invention relates to non-segregating flavored coffee compositions. In particular, the present invention relates to novel flavored coffee compositions that minimize or inhibit the segregation and separation of constituent components, and the corresponding processes for making such compositions.

BACKGROUND OF THE INVENTION

Flavored coffee beverage products enjoy considerable popularity and make up an increasingly significant proportion of daily consumed beverages. However, these flavored coffee beverages are complicated and expensive to produce and frequently suffer from inconsistent product quality; one such reason is the way in which these coffee beverages are flavored.

One common approach to producing flavored coffee beverage products is the admixing of a dry coffee compound with a dried, agglomerated flavoring ingredient of similar size capable of solubilization when the coffee product is being extracted and/or dissolved. The flavoring ingredients are bound together via the application of an agglomerating fluid or binding solution. As there is little or no difference in relative particle sizes between the coffee particles and the flavoring ingredients, segregation and separation generally do not occur. See U.S. Pat. No. 6,207,206 B1 to Mickowski et al., herein incorporated by reference.

However, this approach has several deficiencies, most notable of which is the increased production cost resulting from both additional raw materials and additional processing steps required to produce the agglomerates. Moreover, inconsistent flavor delivery is frequently encountered, resulting from differing rates of extraction and/or solubilization between the coffee and the agglomerated flavoring ingredients.

In an attempt to overcome the deficiencies of the agglomeration flavoring method, liquid flavoring components have been used to deliver a desired degree of flavoring impact. In this approach, liquid flavoring ingredients are applied to the surface of coffee particles so as to coat them. However, this approach is not without its own set of problems. The liquid flavoring compounds typically used in these applications contain volatile compounds that may evaporate when exposed to the atmosphere, thereby losing their potency. Additionally, not all flavor combinations are possible, as a desired flavor may not be available in liquid form. Finally, liquid flavoring compositions frequently contain evaporative solvents that contribute to volatile flavor loss. These solvents also tend to undergo adverse reactions with the materials typically used in conventional coffee containers (e.g., tin, plastic, paper, and the like). The use of specially treated and costly packaging is therefore required in order to resist such reactions and preserve coffee flavor, quality, and aroma.

To compensate for evaporation it is necessary to apply the flavoring agent in amounts well in excess of what is actually required to deliver the desired flavor load. Another shortcoming of the application of liquid flavorants is the non-uniform coverage of the coffee particles, thereby resulting in inconsistent product quality in the ready to drink form of the beverage, as some prepared beverage portions will receive more or less than the intended flavor level.

Yet another approach to providing flavored coffee products is the practice of separating the flavor and coffee ingredients by combining the flavoring ingredient with a filter media or other membrane that the extracted or solubilized coffee solution must come into contact with. See U.S. Pat. No. 6,004,593 to Soughan et al., herein incorporated by reference. This process, however, requires the use of special equipment and/or materials (e.g., filters) to obtain a flavored coffee beverage product. Moreover, not all consumers desired flavors may be available in a form capable of being utilized in such a fashion.

Therefore, considerable effort has been expended in an attempt to address the product formulation and consumer acceptance limitations of using the flavored compositions and techniques heretofore described. Furthermore, there remains a need in the art for compositions and methods of flavoring coffee that ensure high quality and consistent flavor delivery. In particular, inexpensive non-segregating flavoring methods that are easily adaptable to a variety of coffee materials are desirable. Accordingly, it is an object of the present invention to provide compositions and methods which address these needs and provide further related advantages.

SUMMARY OF THE INVENTION

The present invention is directed towards methods of flavoring coffee, and the products and compositions derived therefrom, that minimize both processing steps and cost while simultaneously ensuring a coffee product with a consist and uniform flavor impact. In particular, the present invention relates to novel flavored coffee compositions that minimize or inhibit the segregation and separation of constituent components, and the corresponding processes for making such compositions. The flavored coffee compositions herein comprise, on a dry weight basis, from about 80% to about 99.5% of a coffee component, preferably from about 85% to about 98%, more preferably from about 90% to about 97%, and yet more preferably from about 92% to about 96%.

The coffee component is comprised of a roast and ground coffee component, an instant coffee component, or mixtures thereof. The roast and ground coffee component will have a moisture level in the range of from about 1% to about 15%, a particle density in the range of from about 0.1 g/cc to about 0.45 g/cc, and a mean particle size distribution in the range of from about 400 microns to about 1300 microns. The instant coffee components used herein will have a particle density in the range of from about 0.1 g/cc to about 0.8 g/cc, a mean particle size distribution in the range of from about 250 microns to about 2360 microns, and a moisture level in the range of from about 1% to about 4.5%.

The flavored coffee composition herein further comprises, on a dry weight basis, from about 0.5% to about 20% of a flavoring component, preferably from about 2% to about 15%, more preferably from about 3% to about 10%, yet more preferably from about 4% to about 8%.

The flavoring component has a moisture level in the range of from about 1% to about 7%, a particle density in the range of from about 0.1 g/cc to about 0.8 g/cc, and a mean particle size distribution in the range of from about 5 microns to about 150 microns. The ratio of coffee component particle size to flavor component particle size is in the range of from about 100:1 to about 5:1.

DETAILED DESCRIPTION OF THE INVENTION

A. Definitions

As used herein, the term "Bulk Density" refers to the overall density of a plurality of particles measured in the manner described on pp. 127-131 of *Coffee Processing Technology*, Vol. II, Avi Publishing Company, Westport, Conn. (1963), herein incorporated by reference. As used herein, the term "PSD" means particle size distribution as defined on pp. 137-140 of *Coffee Processing Technology*, Vol. II, Avi Publishing Company, Westport, Conn. (1963), herein incorporated by reference.

As used herein, the term "Distribution Value" is defined as the numerical representation of the degree to which the flavoring components are distributed throughout the flavored coffee compositions, or portions thereof. The value is represented as a distribution value percentage relative standard deviation (DV % RSD), where a uniform distribution would be represented as 0% RSD. The Distribution Value is calculated according to the "Distribution Value Determination" method explained herein.

As used herein, the term "Agglomeration" is defined as the process of preparing relatively larger particles by combining a number of relatively smaller particles into a single unit. Many specialized processes and types of processing equipment have been developed for the agglomeration of particulate solids. See, for example, pp. 177-209 of *Coffee Solubilization Commercial Processes and Techniques*, Pintaufo, N.D., Noyes Data Corporation, "Agglomeration Techniques", (1975), herein incorporated by reference.

It will be appreciated by the ordinarily skilled artisan that the following basic operating principles are involved in practically all agglomeration techniques. First, an agglomerating fluid (e.g., oil, liquid water or steam) is dispersed throughout the particles to be agglomerated, causing part or all of the surfaces of the particles to become tacky. Subsequently, the particles are agitated, allowing the tacky surfaces of the particles to come into contact with and adhere to other particles. Proper control of the amount of agglomerating fluid and the type and time of agitation will provide control over the final size of the agglomerated product. Agglomeration methods which use water as an agglomerating fluid typically result in a high density product which does not quickly dissolve. Following agglomeration and agitation, the resulting agglomerated particles are dried, typically to a moisture content of about 3.5% or less. It is believed in the art that this moisture level will help minimize flavor deterioration and caking. The agglomerated particles can be air dried, vacuum dried, dried in a fluidized bed, dried in a vibratory fluidized bed, or with any other suitable drying apparatus.

Publications and patents are referred to throughout this disclosure. All references cited are hereby incorporated by reference. All percentages and ratios are calculated by weight unless otherwise indicated. All percentages and ratios, unless otherwise indicated, are calculated based on the total composition.

As used herein, and unless otherwise indicated, the use of a numeric range to indicate the value of a given variable is not intended to be limited to just that stated range. One of ordinary skill in the art will appreciate that the use of a numeric range to indicate the value of a variable is meant to include not just the values bounding the stated range, but also all values and sub-ranges contained therein. By way of example, consider variable X which is disclosed as having a value in the range of 1 to 5. One of ordinary skill in the art will understand that variable X is meant to include all integer and non-integer values bounded the by the stated range. Moreover, one of ordinary skill in the art will appreciate that the value of the variable also includes all combinations and/or permutations of sub-ranges bounded by the integer and non-integer values, unless otherwise indicated.

All component or composition levels are in reference to the active level of that component or composition and are exclusive of impurities, for example, residual solvents or by-products, which may be present in commercially available sources.

Referred to herein are trade names for components including various ingredients utilized in the present invention. The inventors herein do not intend to be limited by materials under a certain trade name. Equivalent materials (e.g., those obtained from a different source under a different name or catalog number) to those referenced to by trade name may be substituted and utilized in the compositions, kits, and methods described herein.

In the description of the invention various embodiments and/or individual features are disclosed. As will be apparent to the ordinarily skilled practitioner, all combinations of such embodiments and features are possible and can result in preferred executions of the present invention.

B. Ingredients

The non-agglomerated, flavored coffee compositions herein comprise a coffee component and a flavoring component that are in intimate contact with each other. The flavoring and coffee components remain in contact with each other in the absence of a binding agent and/or agglomerating solution.

1. Coffee Component

The coffee component of the present invention is comprised of roast and ground coffee particles, instant coffee particles, or mixtures thereof. The roast and ground coffee utilized herein is commonly known in the art, and is a widely utilized form of coffee. A variety of processes are known to those skilled in the art for roasting, grinding or otherwise preparing coffee. The roasting conditions selected for a given coffee source can be characterized by roast time, roasting equipment, and a Hunter L* color.

Typically, roast and ground coffee is prepared by drying green coffee beans, roasting the beans, cooling the roasted beans, and subsequently grinding the beans, though those skilled in the art will appreciate that the exact sequence may vary somewhat. See, for example, U.S. Pat. No. 4,637,935, to Kirkpatrick et al., issued Jan. 20, 1987, herein incorporated by reference, which describes a unique process for preparing a roast and ground coffee, and also discusses other known processes for preparing roast and ground coffee.

The beans utilized in making the flavored coffee compositions of the present invention may be any of a variety of available coffee beans, or a blend of two or more varieties. For example, Brazilian, natural Arabica, washed Arabica, and Robusta varieties may be used, either alone or in combination. The roast and ground coffee can be caffeinated, decaffeinated, or a blend of both. The coffee may also be processed to reflect one of many unique flavor characteristic such as espresso, French roast, and the like. Suitable coffee components for use in the present invention can be prepared specifically for the formulation of the flavored coffee compositions and beverages, or may be purchased and used "as is" from a variety of commercial coffee houses.

The roasting process may utilize any method of heat transfer. For example, convective heat transfer is typical. Roasting equipment and methods suitable for roasting coffee beans are described in, for example, Sivetz, *Coffee Technology*, Avi Publishing Co., 1979. Additionally, U.S. Pat. No. 3,964,175, to Sivetz et al., issued Jun. 22, 1976 discloses a method for fluidized bed roasting of coffee beans. Other roasting techniques are described and referenced in U.S. Pat. No. 5,160,757, Kirkpatrick et al., issued Nov. 3, 1992.

Roasting may be applied until the desired roast bean color is achieved. Roast color and color differences are defined in terms of readings measured on a Hunter colorimeter and specifically the values L*, a* and b* derived from the Hunter CIE scale. See pages 985-95 of R. S. Hunter, "Photoelectric Color Difference Meter," *J. of the Optical Soc. of Amer.*, Volume 48, (1958). The beans are then cooled to stop roast-related pyrolysis reactions. The beans are then prepared for brewing or extracting, either on site or by the ultimate consumer, by grinding. Preferred grinding techniques for preparing the roast and ground coffees to be used herein will result in mean particle size distributions in the range of from about 400 microns to about 1300 microns, preferably in the range from about 450 microns to about 1000 microns, more preferably in the range from about 650 microns to about 800 microns.

As used herein, roast and ground coffee also refers to "flaked" coffees. Flaked coffee is described in U.S. Pat. Nos. 4,331,696; 4,267,200; 4,110,485; 3,660,106; 3,652,293; and 3,615,667, each of which is incorporated herein by reference.

The roast and ground coffee component used herein will have a particle density in the range of from about 0.1 g/cc to about 0.45 g/cc, preferably in the range from about 0.25 g/cc to about 0.4 g/cc, more preferably in the range from about 0.28 g/cc to about 0.33 g/cc. Moreover, the roast and ground coffee components used herein, will have a moisture level in the range of from about 1% to about 15%, preferably from about 1% to about 10%, more preferably from about 1% to about 7%, even more preferably from about 1% to about 5%.

The coffee component of the present invention may also be comprised of instant coffee, either alone or in combination with a roast and ground coffee. The instant coffee utilized herein is of the type commonly known in the art. Suitable instant coffees for use herein can be prepared from any single variety of coffee or a blend of different varieties. The instant coffee can be caffeinated, decaffeinated, or a blend of both and can be processed to reflect a particularly desirable flavor characteristic such as espresso, French roast, or the like.

An instant coffee component of the type used in the present invention can be prepared by any convenient processes, a variety of which are known to those skilled in the art. Typically, instant coffee is prepared by roasting and grinding a blend of coffee beans, extracting the roast and ground coffee with water to form an aqueous coffee extract, and drying the extract to form instant coffee. Instant coffee useful in the present invention is typically obtained by conventional spray drying processes. Representative spray drying processes that provide a suitable instant coffee for use in the present invention are disclosed in U.S. Pat. No. 2,750,998 to Moore et al., issued Jun. 19, 1956; U.S. Pat. No. 2,469,553 to Hall et al., issued May 10, 1949; U.S. Pat. No. 2,771,343 to Chase et al., issued Nov. 20, 1956; and at pages 382-513 of Sivetz & Foote, *Coffee Processing Technology*, Vol. 1, Avi Publishing Co., (1963), each of which is herein incorporated by reference.

Other suitable processes for providing an instant coffee component suitable for use in the present invention are disclosed in U.S. Pat. No. 3,436,227 to Bergeron et al., issued Apr. 1, 1969; U.S. Pat. No. 3,493,388 to Hair et al., issued Feb. 3, 1970; U.S. Pat. No. 3,615,669 to Hair et al., issued Oct. 26, 1971; U.S. Pat. No. 3,620,756, to Strobel et al., issued Nov. 16, 1971; and U.S. Pat. No. 3,652,293 to Lombana et al., issued Mar. 28, 1972, each of which is herein incorporated by reference. In addition to spray dried instant coffee powders, instant coffee useful in the present invention can include freeze-dried coffee.

The instant coffee components used herein will have a particle density in the range of from about 0.1 g/cc to about 0.8 g/cc, preferably from about 0.2 g/cc to about 0.5 g/cc, more preferably from about 0.2 g/cc to about 0.35 g/cc. Moreover, the instant coffee component will have a mean particle size distribution in the range of from about 250 microns to about 2360 microns, preferably from about 500 microns to about 1500 microns, more preferably from about 800 microns to about 1100 microns. Finally, the instant coffee components, as used herein, will have a moisture level in the range of from about 1% to about 4.5%, preferably from about 1% to about 4%, more preferably in the range from about 1% to about 3%.

Preferably, the coffee components used in the present invention, (e.g., roast and ground, instant, and mixtures thereof) will have a substantially non-uniform shape, wherein the surface will be characterized by having a pocketed, jagged, cratered, and/or creviced morphology.

2. Flavoring Component

The flavoring agents useful herein include any substantially dry flavoring agent with the appropriate physical characteristics. As used herein, the term "substantially dry" is defined as having a moisture level insufficient to produce "tackiness" on the surface of the compound. Suitable flavoring agents are selected from the group comprising dried flavoring compounds, crystalline flavor compounds, encapsulated flavoring compounds, including encapsulated liquid flavoring compounds, and mixtures thereof. Preferred flavoring agents are encapsulated liquid flavoring compounds that have been treated in such a way (e.g., by applying a coating) as to allow the resulting particle to behave as would a dry flavoring compound.

As used herein, the term "liquid" includes liquids, viscous liquids, slurries, foams, pastes, gels and the like. In the compositions of the present invention liquid flavoring compounds are encapsulated in a material comprising specifically selected materials, prior to their inclusion in the flavored coffee composition. As used herein, the term "encapsulated" is broadly defined to include any method whereby the flavoring component and the selected encapsulating material are comixed and are formed into discrete particles for addition into the flavored coffee composition. Thus, as used herein, the term "encapsulated" includes the operations known in the art as prilling, encapsulating, agglomerating, noodling, comixing, coating, flaking, shredding, marumerizing and the like.

One suitable method by which an additive component may be covered by an outer shell of encapsulating material is described in U.S. Pat. No. 3,310,612, to Somerville et al., issued Mar. 21, 1967, herein incorporated by reference. A prilled product can be formed by spraying a melt of the encapsulating material with the additive component into a tower through which a cold stream of air is introduced, thus causing the spray melt to solidify into small spheres or the like. An example of such a process is described in *The Chemical Engineer*, No. 304, December 1975, pp. 748-750, and in U.S. Pat. No. 3,742,100, each of which is herein incorporated by reference. The process of marumerizing comprises the subjecting of flavor component-containing pellets, prepared by the extrusion of a mixture of the flavor component together with the encapsulating material, to a spheroidizing process using a rotational speed of up to about 2,000 rpm in an apparatus causing centrifugal and frictional forces to be applied to the pellets. An example of a suitable marumerizing process is described in British Pat. Specification No. 1,361,387, herein incorporated by reference.

The encapsulating material (i.e., the material used to encapsulate the flavoring compound) may comprise one or more conventional, food grade, normally solid, water-soluble materials which are generally known and used for "encapsulating" particles in aqueous systems. Examples of such components include carboxymethylcellulose, ethyl cellulose, maltodextrin gelatin, gum arabic and gum agar. Crosslinking agents, such as $TiO_2$ and Monomide S may also be included.

Acceptable flavoring compounds may comprise natural flavors, artificial flavors, and mixtures thereof. As used herein, the term "natural flavors" is defined as a solid, liquid, or gaseous form of a specific natural flavorant (e.g., ground cocoa, liquid vanilla extract, powdered almonds, and the like). Mixtures of solid, liquid, and gaseous forms of a specific natural flavorant are also acceptable. The term "natural flavors" is also intended to encompass extracts, essences, distillates, and oils of a given flavorant.

As used herein, the term "artificial flavors" includes compounds capable of imparting a substantially similar flavor perception to that of a desired natural flavorant (e.g., chocolate, hazelnut, mint, etc.), though the artificial flavor is not necessarily derived from the specific natural flavorant. It is contemplated by the Applicants that though an artificial flavor source may comprise compounds similar or identical to those found in a corresponding natural flavorant, the artificial flavor source would not contain all of the ingredients or compounds typically found in the natural flavorant (e.g., naturally present compounds that would, if present, impart a dispreferred flavor note or detract from the desired flavor note). Additionally or alternatively, it is contemplated that the artificial flavor source may contain the desired flavor imparting compound(s) as found in the naturally occurring flavorant, although not necessarily in the same detectable concentration. Artificial flavors may be derived from both natural and synthetic processes and sources, as those terms are known and used in the art.

Preferred flavoring compounds include compounds capable of delivering the following flavors: almond nut, amaretto, anisette, brandy, butter rum, cappuccino, mint, cinnamon, cinnamon almond, creme de menthe, grand mariner, peppermint, pistachio, sambuca, apple, chamomile, chocolate, cinnamon spice, cocoa, cream, butter, lavender, maple, milk (in all forms), creme, vanilla, French vanilla, Irish creme, Kahlua, lemon, hazelnut, almond, pecan, lavender, macadamia nut, orange, orange leaf, peach, strawberry, grape, raspberry, cherry, other fruit flavors, and the like, including mixtures thereof. Aroma enhancers such as acetaldehyde, herbs, spices, as well as mixtures of these with the foregoing flavoring compounds may also be included.

Preferred artificial flavoring compounds include flavoring compounds capable of delivering vanilla, French vanilla, vanilla nut, coffee, hazelnut, Irish creme, amaretto, rum, caramel and almond flavors. In one embodiment of the present invention, preferred flavoring compounds are artificial flavorants imparting a coffee or coffee-like flavor.

The flavoring components used herein will have a particle density in the range of from about 0.1 g/cc to about 0.8 g/cc, preferably from about 0.3 g/cc to about 0.6 g/cc, more preferably from about 0.4 g/cc to about 0.5 g/cc. Moreover, the flavoring components will have a moisture level in the range of from about 1% to about 7%, preferably from about 1% to about 5.5%, more preferably from about 1% to about 4%.

Suitable flavoring components for use in the present invention will have a mean particle size distribution in the range of from about 5 microns to about 150 microns, preferably from about 30 microns to about 100 microns, more preferably from about 40 microns to about 60 microns.

3. Optional Ingredients i) Creamers

The flavored coffee compositions of the present invention may optionally contain one or more creamers. As used herein, the term "creamer" refers to an additive used in many ready-to-drink and instant beverage products. Commercial creamers are readily available, and are readily chosen by those of ordinary skill in the art. Prepared creamers generally comprise fat, emulsifiers, and processing aids. Accordingly, the beverage compositions of the present inventions may utilize creamers and, depending on the composition of the particular creamer chosen, all or part of the fat, emulsifier or processing aids used in the composition can be, in fact, contributed by the creamer.

Suitable creamers for use in the flavored beverage products of the present invention include dairy and non-dairy creamers. Suitable dairy creamers include whole milk solids; butterfat solids; low-fat dry milk; and dry mixes used to prepare ice cream, milkshakes, and frozen desserts, as well as mixtures of these dairy creamers. Suitable non-dairy creamers can be made from a variety of fats and oils including soybean and partially-hydrogenated soybean oil, partially-hydrogenated canola oil, hydrogenated and partially-hydrogenated coconut oil, as well as other partially- or fully-hydrogenated vegetable oils, or combinations of such oils. Preferred creamers include non-dairy creamers made from vegetable oils, emulsifiers, co-emulsifiers, carbohydrates, sodium caseinate, and buffers. Additional creamers suitable for use in the present invention include those synthetic and imitation dairy products disclosed in KIRK-OTHMER ENCYCLOPEDIA OF CHEMICAL TECHNOLOGY, W. J. Harper, Willey Interscience, $3^{rd}$ edition, Vol. 22, section entitled "Synthetic and Imitation Dairy Products," pp. 465-498, (1978), which is hereby incorporated by reference.

Both foaming and non-foaming creamers can be used in the flavored beverage products of the present invention. Foaming creamers suitable for use in the present invention can comprise a non-dairy fat (e.g., partially hydrogenated oil), a water-soluble non-dairy carbohydrate (e.g., sucrose, dextrose, maltose, corn syrup solids and mixtures thereof), a buffer, a proteinaceous foam stabilizing agent (e.g., sodium caseinate) and/or optionally a gum thickener. These solid components can be mixed with water and then homogenized. A gas (e.g., nitrogen) can be injected or blended into this mixture and the mixture is spray-dried to provide the foaming creamer. See U.S. Pat. 4,438,147 (Hedrick, Jr.), issued Mar. 20, 1984; and U.S. Pat. 5,462,759 (Westerbeek et al), issued Oct. 31, 1995, each of which is herein incorporated by reference. Non-foaming creamers suitable for use in the present invention have an ingredient composition similar to that of the foaming creamers but without the incorporated gas. Also, foaming creamers typically have more proteinaceous components (typically about 12-13% of total ingredients) relative to non-foaming non-dairy creamers (typically about 3.5% of total ingredients).

ii) Aroma Enhancers

Aroma enhancers such as acetaldehyde, herbs, spices, and the like, may be included in the flavored coffee compositions of the present invention.

iii) Sweeteners

A sweetener or combination of sweeteners may be useful for sweetening the flavored coffee compositions of the present invention. Such sweeteners include natural and artificial sweeteners and combinations thereof. Suitable natural sweeteners useful in the present invention include, but are not limited to, sucrose, fructose, dextrose, maltose, lactose, and mixtures thereof Suitable artificial sweeteners include, but are not limited to, saccharin, cyclamates, acesulfame K (Sunette.™.), L-aspartyl-L-phenylalanine lower alkyl ester sweeteners (e.g. Aspartame.™.); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethyalkaneamide sweeteners disclosed in U.S. Pat. No. 4,423,029 to Rizzi; and L-aspartyl-D-phenylglycine ester and amide sweeteners disclosed in European Pat. Application 168,112 to J. M. Janusz, published Jan. 15, 1986; and the like and mixtures thereof.

iv) Thickeners

Flavored coffee compositions according to the present invention can comprise thickening agents. These thickening agents can include natural and synthetic gums, and natural and chemically modified starches. Suitable gums include locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, as well as mixtures of these gums. Suitable starches include, but are not limited to, pregelatinized starch (corn, wheat, tapioca), pregelatinized high amylose content starch, pregelatinized hydrolyzed starches (maltodextrins, corn syrup solids), chemically modified starches such as pregelatinized substituted starches (e.g., octenyl succinate modified starches such as N-Creamer, N-Lite LP, TEXTRA, manufactured by National Starch), as well as mixtures of these starches. It is particularly preferred that thickening agents be predominantly made from starches and that no more than about 20%, most preferably no more than about 10%, of the thickener be made from gums. These thickening agents can also be incorporated into these flavored beverage products as part of the carrier for the emulsified fat on the spray dried non-foaming creamer.

C. Flavored Coffee Compositions and Method of Making

The flavored coffee compositions of the present invention comprise a flavoring component in intimate contact with a coffee component, wherein said components remain in contact with each other without the use of an agglomerating solution or binding agent.

The ratio of the coffee component to the flavoring component is determined by the desired degree of flavor impact and flavor loading/concentration. Preferably, the flavored coffee compositions of the present invention comprise from about 80% to about 99.5%, on a dry weight basis, of the coffee component, and from about 0.5% to about 20%, on a dry weight basis, of a flavoring component. In preferred embodiments of the present invention the flavored coffee compositions comprise from about 85% to about 98% of a coffee component and from about from about 2% to about 15% of a flavoring component, more preferably the compositions comprises from about 90% to about 97% of a coffee component and from about 3% to about 10% of a flavoring component; yet more preferably from about 92% to about 96% of a coffee component and from about 4% to about 8% of a flavoring component.

The desired mean particle size distribution of the coffee component particles and the flavoring component particles of the present invention is determined in part by the exact type of coffee component and flavoring component selected for use. The ratio of the mean particle size distribution of the coffee component to the mean particle size distribution of the flavoring component is in the range of from about 100:1 to about 5:1, preferably from about 50:1 to about 5:1, more preferably from about 25:1 to about 6:1, yet more preferably from about 15:1 to about 7:1.

Not intending to be limited by theory, the inventors believe that the flavoring component particles remain in contact with the coffee component particles because of the particle size ratios and a combination of forces, including frictional forces and Vander Wall's forces.

Vander Walls forces are defined as the series of attractive forces between unlike charged molecules or macromolecules. These electronic forces are based on the changing electronic charge (i.e., momentary dipoles) of a molecule, the induced electronic charge (i.e., induced dipole) of a molecule or the permanent electronic charge (i.e., symmetrical dipole) of a molecule contacting another molecule or macromolecule of an opposite charge.

It is believed that the electronegative material of the flavoring compound, or encapsulating material of an encapsulated flavoring compound, is attracted to the less polar coffee particle. The tumbling action of the particles during mixing provides the mixture enough energy to effectively allow each of the flavor component particles to move around the coffee until an area of positive charge (i.e., a bonding site) is located. From that point forward the flavor particle and the coffee particles remain in intimate contact until a more electronegative force breaks them apart (e.g., when water contacts the coffee and solubilizes the flavor component particles). For a more detailed discussion see *Organic Chemistry, 3rd Edition*, Morrison & Boyd pp. 3-4, herein incorporated by reference.

In preparing the non-agglomerated flavored coffee compositions contemplated by the present invention the desired flavoring component is typically selected first. Based on the intended flavor impact, the type of flavoring component(s) selected (e.g., solid, crystalline, encapsulated liquid, etc.), the corresponding physical characteristics (e.g., particle size, particle density, particle moisture, etc.), and component morphology (e.g., pocketed, jagged, cratered, and/or creviced) a suitable coffee component is selected. However, it will be appreciated by one skilled in the art, upon reading the disclosure herein, that the coffee component (e.g., roast and ground, instant, or mixtures thereof) may be selected first and then a suitable flavoring component could be identified using the same criteria.

Once suitable coffee components and flavoring components are identified and selected, they are mixed together. One of ordinary skill in the art will appreciate that any mixing apparatus or process that imparts sufficient mechanical energy to allow the coffee and flavoring particles to tumble over each other is acceptable. Suitable mixing devices include ribbon, plow, screw, and paddle type mixers.

The particles of the coffee and flavoring components are mixed together for a time sufficient to provide a flavored coffee composition with a desired Distribution Value, utilizing the Distribution Value Determination method described herein.

It will be appreciated by one of ordinary skill in the art that some steps of the above described process may be avoided, additional steps may be added, or the sequence of steps may altered without deviating from the scope of the present invention.

D. Segregation and Distribution Value

Segregation and separation of flavoring component particles from the coffee component particles and the bulk of the flavored coffee composition mass is caused by a variety of factors experienced during production, processing, packaging, shipping, storage, and dispensing. Of these factors, the most notable are vibration, percolation, trajectory of falling particles, angle of repose, and impact on a heap. In the flavored coffee compositions of the present invention it is critical to inhibit the segregation or separation of particles in order to ensure a consistent flavor impact over multiple serving portions. For a more detailed discussion of segregation see *Handbook of Powder Science & Technology*, $2^{nd}$ Edition, Edited by Fayed & Otten, International Thomson Publishing, 1997, pp. 446-453, herein incorporated by reference.

The degree of segregation or separation is measured using a Distribution Value. As used herein, the term "Distribution Value" is defined as the numerical representation of the degree to which the flavoring component particles are distributed throughout the flavored coffee compositions, or segment thereof. The Distribution Value is represented as a percentage relative standard deviation (DV % RSD), where a completely uniform distribution would be represented as 0% RSD.

In the flavored coffee compositions of the present invention, a Distribution Value of less than about 50% RSD is preferred, a Distribution Value of less than about 30% RSD is more preferred, a Distribution Value of less than about 20% RSD is still more preferred, and a Distribution Value of less than about 10% RSD is most preferred.

ANALYTICAL METHODS

A. Distribution Value Determination

The Distribution Value is defined herein as the numerical representation of the degree to which the particles of the flavoring component are distributed throughout the flavored coffee compositions, or segment thereof. The general process of measuring a given Distribution Value is characterized by the steps of:
(1) Developing and validating a partial least squares regression calibration model for the specific flavor component(s) to be used in the flavored coffee composition.
(2) Analyzing the Flavored Coffee Composition of interest by the process steps of;
 (i) providing a flavored coffee composition of interest;
 (ii) preparing and analyzing at least three (3) discrete samples of the flavored coffee composition on an Agilent Model 4440 mass spectroscopy (MS) sensor;
 (iii) providing a partial least squares regression model, using chemometric techniques, for the specific flavor component(s) used in the preparation of the flavored coffee composition;
 (iv) using the developed partial least squares regression model to calculate predicted flavor addition levels for the analyzed samples;
 (v) calculating the mean and standard deviation of the output of the discrete samples; and,
 (vi) applying Equation 1 to the resulting data to generate a Distribution Value.

$$\text{Distribution Value} = \text{Standard Deviation} \times (100/\text{mean}) \quad \text{Equation 1}$$

Calibration Process

In order to accurately determine the Distribution Values for a flavored coffee composition of interest it is necessary to develop a calibration model for the flavor component(s) used in the flavored coffee composition. The first step in the process is to provide a suitable Coffee Component as the base for a flavored coffee composition calibration sample set. Suitable coffee components are those coffee components as described herein. Secondly, a suitable flavor component is provided. Suitable flavor components, as described herein, comprise volatile components which would evaporate into any available packaging headspace. Suitable flavor sources will also exhibit at least one mass fragment difference, under MS analysis, from those of the provided coffee source.

Next, a calibration sample set is prepared by combining the provided coffee component(s) and flavor component(s) to make at least 3 discrete calibration samples of a flavored coffee composition. At least one calibration sample must contain the same amount of flavor component as is contained in the flavored coffee composition which is to be analyzed for its Distribution Value. At least one calibration sample must contain an amount of flavoring component which is less than the amount in the flavored coffee composition which is to be analyzed. And, at least one calibration sample must contain an amount of flavoring component in excess of the flavored coffee composition which is to be analyzed.

For example if the flavored coffee composition of interest (i.e., the flavored coffee composition to be measured for its Distribution Value) is believed to contain 2% by weight of a flavor component, then one calibration sample should be mixed with 2%, by weight, of the flavor component, the second calibration sample should contain a smaller amount by weight of the flavor component (e.g., preferably 1%), and the third calibration sample should contain a flavor component amount in excess of the 2% contained in the flavored coffee composition of interest (e.g., 3%).

The calibration sample sets are then analyzed using mass spectroscopy equipment and techniques. Each calibration sample level is analyzed in triplicate under the following conditions: 1.00+/−0.05 grams of the sample was weighed into a standard 10 milliliter headspace vial and sealed using a crimp top lid. The vials are then placed into the Agilent 4440 Chemical Sensor for analysis. Within the chemical sensor the sample is equilibrated at 85° C. for 20 minutes and the headspace is sampled and transferred into a 3-milliliter sample loop. The carrier stream is then opened to the loop and the headspace is swept into the mass spectrometer for analysis.

The headspace autosampler conditions used are as follows:
i) sample oven: 85° C.;
ii) valve oven/loop: 105° C.;
iii) MS interface 120° C.;
iv) vial pressure 13.8 psi;
v) carrier gas (Helium) pressure 1.8 psi;
vi) loop equilibration time: 0.05 minutes;
vii) vial pressurization time: 0.20 minutes;
viii) loop fill time: 0.20 minutes;
ix) inject time 1.00 minutes The MS conditions are as follows:
i) mass range 50-150 amu;
ii) split flow to MS 43.8 milliliters;
iii) solvent delay 0.45 minutes;
iv) run time 1.10 minutes;
v) threshold 150;
vi) sampling value 2, 10.26 scans/second.

The data generated from the mass spectroscopy procedure is then processed and analyzed using a commercial chemometrics spectral analysis program called Pirouette (Pirouette by Information, Inc. of Woodville, Wash.). The chemometric analysis program is used to develop a partial least squares regression calibration model. A discussion of partial least square (PLS) regression models and techniques can be found in *Applied Spectroscopy Reviews*, Vol. 31 (1&2), pp. 73-124 (1996) by Workman et al. which is incorporated herein by reference.

Chemometrics is the application of mathematical and statistical methods to extract more useful chemical information from chemical and physical measurement data. Chemometrics applies computerized data analysis techniques to help find relationships between variables among large volumes of raw data. Standard practices for infrared, multivariate, quantitative analysis are described in the "American Society for Testing Materials (ASTM) Practice E1655-94 (1995)"; ASTM Annual Book of Standards, West Conshohocken, Pa. 19428-2959 USA, Vol. 03.06; The Association of Official Analytical Chemists (AOAC) Official Methods of Analysis, 15.sup.th Ed. (1990), pp. 74-76, each of which is incorporated herein by reference.

After the calibration model is developed it is validated utilizing cross validation techniques, whereby the model is progressively developed by sequentially omitting 1 sample from analysis, and using that sample for prediction. Performance statistics are accumulated for each group of removed samples. The optimum number of factors contained within the calibration model is determined by the number of factors which produces a minimum in overall error between modeled and referenced values (standard error of cross validation—SECV) for the samples removed during cross validation. The preprocessing transformations used were the optimum required to improve the SECV compared to PLS analysis with untransformed data.

Determination of Distribution Values During/Following Coffee Composition Mixing

The Distribution Value for the flavoring component in the flavored coffee composition of the present invention, either during or following mixing, is determined according to the following process:
i) Provide flavored a flavored coffee composition with a flavor component addition level between the upper and lower values used to create the calibration model (e.g., 1%, 2%, 3%, etc.);
ii) Select at least 3 samples of the flavored coffee composition from different regions of the mixer, and at least 1 sample randomly drawn from the composition following mixing;
iii) Run samples on the MS Sensor; samples are a 1.0 gram sample weight and are analyzed in triplicate under the same conditions and instrument settings as described in the calibration sample sets;
iv) Use chemometric model to calculate flavor level from raw data;
v) Calculate mean and standard deviation of samples; and,
vi) Using Equation 1 to calculate a Distribution Value.

Determination of Distribution Values During/Following Shipping

The Distribution Value for the flavoring component in the flavored coffee compositions of the present invention, either during or following shipping, is determined according to the following process:
i) Provide flavored a flavored coffee composition with a flavor component addition level between the upper and lower values used to create the calibration model (e.g., 1%, 2%, 3%, etc.);
ii) Pack the flavored coffee composition into a selected package (can or plastic container).
iii) Place the packaged products onto a standard shipping support (pallet). Perform ship test using Test Method D5112-98, Standard Test Method for Vibration (Horizontal Linear Sinusoidal Motion) Test of Products, from the American Society for Testing and Materials, West Conshohocken, Pa.
iv) Select at least 3 samples of the flavored coffee composition from different regions of the mixer, and at least 1 sample randomly drawn from the composition following mixing;
v) Run samples on the MS Sensor; samples are a 1.0 gram sample weight and are analyzed in triplicate under the same conditions and instrument settings as described in the calibration sample sets;
vi) Use chemometric model to calculate flavor level from raw data;
vii) Calculate mean and standard deviation of samples; and,
viii) Using Equation 1 to calculate a Distribution Value.

EXAMPLES

The following examples further describe and demonstrate embodiments within the scope of the present invention. These examples are given solely for the purpose of illustration and are not to be construed as a limitation of the present invention, as many variations thereof are possible without departing from the invention's spirit and scope.

Example I

A flavored coffee composition is prepared by mixing 50 pounds of a roast and ground coffee source with 1.5 pounds of an orange flavor source. The roast and ground coffee source is a blend of 70%, by weight, of an arabica type coffee, roasted on a Thermalo model roaster set at 450° F. for 3 minutes to a Hunter *L color of 20.5 L, and 30%, by weight, of a robusta type coffee roasted on a Thermalo model roaster set at 450° F. for 3 minutes to a Hunter *L color of 19.5 L. Once roasted the coffee source is cooled and then ground so that it has a mean particle size distribution of 743 microns. The ground coffee source blend has a particle density of 0.31 g/cc and a moisture content of 4.5%.

The flavor source is a commercially available dry orange flavor purchased from Givaudan Flavors of Cincinnati, Ohio. The flavor component particles have a mean particle size distribution of 47 microns, a particle density of 0.5 g/cc, and a moisture level of 2%.

The ground coffee component particles and the flavor component particles are mixed in an American Process Systems brand ribbon mixer for 5 minutes, set at 45 rpm. Upon completion of mixing five samples are taken from different regions of the mixer, one from each of the four corners and one from the center of the mixer. The Distribution Value (DV) is measured according to the Distribution Value Determination Method described herein. The DV for Samples 1-5 is determined to be in the range of from about 5% RSD to about 7% RSD.

Example II

A flavored coffee composition is prepared by mixing 50 pounds of the roast and ground coffee source of Example I with 1.5 pounds of a vanilla flavor source. The flavor source is a commercially available encapsulated liquid vanilla flavor purchased from Givaudan Flavors of Cincinnati, Ohio. The flavor component particles have a mean particle size distribution of 47 microns, a particle density of 0.5 g/cc, and a moisture level of 2%.

The ground coffee component particles and the flavor component particles are mixed in a American Process Systems brand ribbon mixer for 5 minutes, set at 45 rpm. Upon completion of mixing five samples are taken from different regions of the mixer. The Distribution Value (DV) is measured according to the Distribution Value Determination Method described herein. The DV for Samples 1-5 is determined to be in the range of from about 5% RSD to about 7% RSD.

Example III

A flavored coffee composition is prepared by mixing 50 pounds of an instant coffee source with 1 pound of a vanilla flavor source. The instant coffee source is a commercially available Brazilian instant coffee blend purchased from Iguacu Coffees of Brazil. The instant coffee source particles have a mean particle size distribution of 820 microns, a particle density of 0.33 g/cc, and a moisture content of 2.5%.

The flavor source is a commercially available encapsulated vanilla flavor purchased from Givaudan Flavors of Cincinnati, Ohio. The flavor component particles have a mean particle size distribution of 47 microns, a particle density of 0.5 g/cc, and a moisture level of 2%.

The ground coffee component particles and the flavor component particles are mixed in a American Process Systems brand ribbon mixer for 5 minutes, set at 45 rpm. Upon completion of mixing five samples are taken from different regions of the mixer. The Distribution Value (DV) is measured according to the Distribution Value Determination Method described herein. The DV for Samples 1-5 is determined to be in the range of from about 8% RSD to about 12% RSD.

Example IV

A ready to drink beverage is prepared by brewing 35.5 grams of the flavored coffee composition of Example I in a standard Mr. Coffee type brewer with 1420 ml of water.

Example V

A ready to drink beverage is prepared by dissolving 3.6 grams of the flavored coffee composition of Example III in a cup with 240 ml of 185° F. water.

Having now described several embodiments of the present invention it should be clear to those skilled in the art that the forgoing is illustrative only and not limiting, having been presented only by way of exemplification. Numerous other embodiments and modifications are contemplated as falling within the scope of the present invention as defined by the appended claims hereto.

What is claimed is:

1. A method of preparing a non-agglomerated flavored coffee composition comprising the steps of:
    a) combining:
        (i) from about 80% to about 99.9% of a coffee component, wherein said coffee component has a moisture level in the range of from about 1% to about 5%, a particle density in the range of from about 0.28 g/cc to about 0.33 g/cc, a mean particle size distribution in the range of from about 650 microns to about 800 microns; and,
        (ii) from about 0.1% to about 20% of a flavoring component, wherein said flavor component has a moisture level in the range of from about 1% to about 4%, a particle density in the range of from about 0.4 g/cc to about 0.5 g/cc, a mean particle size distribution in the range of from about 40 microns to about 50 microns;
        wherein the size ratio of said coffee component to said flavor component is in the range of from about 100:1 to about 5:1;
    b) mixing said coffee component and said flavoring component for a period of time sufficient for said flavored coffee composition to exhibit a Distribution Value of less than about 20% RSD;
    wherein said coffee component is selected from the group consisting of roast and ground coffee, instant coffee, and mixtures thereof;
    wherein said flavoring component is selected from the group consisting of dried flavoring compounds, crystalline flavor compounds, encapsulated flavoring compounds, encapsulated liquid flavoring compounds, and mixtures thereof; and
    further comprising one or more additional ingredients selected from the group consisting of creamers, aroma enhancers, natural sweeteners, artificial sweeteners, thickening agents, and mixtures thereof.

\* \* \* \* \*